US008755571B2

(12) United States Patent
Tsai et al.

(10) Patent No.: US 8,755,571 B2
(45) Date of Patent: Jun. 17, 2014

(54) IMAGE METHOD FOR CLASSIFYING INSECTS AND CLASSIFYING PROCESS FOR INSECTS

(75) Inventors: Hung-Yin Tsai, Hsinchu (TW);
Yu-Ching Lin, Hsinchu (TW);
Yu-Cheng Wu, Hsinchu (TW);
Rong-Shun Chen, Hsinchu (TW); Hong Hocheng, Hsinchu (TW); Li-An Chu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 150 days.

(21) Appl. No.: 13/419,155

(22) Filed: Mar. 13, 2012

(65) Prior Publication Data
US 2013/0083974 A1 Apr. 4, 2013

(30) Foreign Application Priority Data

Sep. 29, 2011 (TW) .............................. 100135303 A

(51) Int. Cl.
*G06K 9/00* (2006.01)
(52) U.S. Cl.
USPC .......................................... 382/110; 382/128
(58) Field of Classification Search
None
See application file for complete search history.

(56) References Cited

U.S. PATENT DOCUMENTS

| | | | | |
|---|---|---|---|---|
| 6,396,938 B1 * | 5/2002 | Tao et al. | ....................... | 382/110 |
| 2003/0185422 A1 * | 10/2003 | Taniguchi | ..................... | 382/110 |
| 2009/0153659 A1 * | 6/2009 | Landwehr et al. | ............ | 348/135 |
| 2010/0119127 A1 * | 5/2010 | Bello et al. | ..................... | 382/128 |
| 2010/0186284 A1 * | 7/2010 | Hyde et al. | .................... | 43/132.1 |
| 2010/0322483 A1 * | 12/2010 | Margolis et al. | .............. | 382/110 |
| 2011/0007946 A1 * | 1/2011 | Liang et al. | .................... | 382/103 |

OTHER PUBLICATIONS

Houle, David, et al. "Automated measurement of *Drosophila* wings." BMC Evolutionary Biology 3.1 (2003): 25.*
Dankert, Heiko, et al. "Automated monitoring and analysis of social behavior in *Drosophila*." Nature methods 6.4 (2009): 297-303.*
Reza, Md Alimoor. Automated categorization of *Drosophila* learning and memory behaviors using video analysis. Diss. Drexel University, 2011.*
Cline and, Thomas W., and Barbara J. Meyer. "Vive la difference: males vs females in flies vs worms." Annual review of genetics 30.1 (1996): 637-702.*
Branson, Kristin, et al. "High-throughput ethomics in large groups of *Drosophila*." Nature methods 6.6 (2009): 451-457.*

* cited by examiner

*Primary Examiner* — Stephen R Koziol
*Assistant Examiner* — Sean Conner
(74) *Attorney, Agent, or Firm* — Thomas | Horstemeyer, LLP

(57) ABSTRACT

An image method for classifying insects includes the following steps: obtaining detecting images of the insects in a detecting area; obtaining a first foreground image related to the insects by background subtraction; extracting the saturation from the first foreground image and eliminating the non-characteristic objects therein to obtain a second foreground image; extracting the characteristics related to the insects from the second foreground image according to a threshold; and, determining the classifications or the sexes of the insects according to the characteristics. Accordingly, the image method for classifying insects can be used for automatically classifying the insects so as to save the manpower and time.

6 Claims, 5 Drawing Sheets

IMAGE METHOD FOR CLASSIFYING INSECTS AND CLASSIFYING PROCESS FOR INSECTS

CROSS-REFERENCE TO RELATED APPLICATION

This application claims priority to and the benefit of Taiwan Application Serial Number 100135303 filed on Sep. 29, 2011, which is incorporated by reference in its entirety.

BACKGROUND OF THE INVENTION

1. Field of the Invention

The present invention relates to an image method for classifying insects, and more particularly, to an image detection method which can classify the insects automatically, and a classifying process for insects which applies the image detection method.

2. Description of the Prior Art

Genetics is the science of genes, heredity, and variation in living organisms, and meanwhile genetics is an important branch of life science. For other branches, many of them are derived from the research of gene based on genetics, such as genetic engineering. Genetics not only plays a large role in the appearance and behavior of organisms but also can explain the macroscopic property of biological phenomenon with microscopic analysis. With the development and prosperity of genetic, the physiological problem, such as aging and disease, has been improved. Therefore, many researchers pay attention to the research of genes.

The genetic number of fruit flies is about one third of the number of human genes, however, the controlling gene of fruit flies is similar to the controlling gene of humanity in physical development, additionally, with the advantages of the short life cycle and mass reproduction, and fruit flies became popular model organisms in genetics research. So far, there are a lot of research about fruit flies in genetics, cell-biology, biochemistry, and especially developmental biology. Fruit flies made a greater contribution to genetics knowledge for almost a century.

In the genetic research of fruit flies, the researchers need to collect unbred female fruit flies, in order to confirm that the result of the genetics experimentation is accurate without any influence of male genes. To recognize unbred female fruit flies, the fruit fly should be fixed below the microscopy manually and then distinguish the abdominal characteristic in conventional method. Due to fruit flies breed abundantly and rapidly, and the female fruit flies take eight time to turn into sexual maturation after eclosion, it is necessary to keep on doing gender identification between the same interval so as to avoid fruit flies mating with each other. Otherwise, fruit flies are too small to be observed, so the researchers need to spend a large amount of money and time to adjust and improve the position of fruit fly for optimum observation. Therefore, it is really inefficient with the above method.

In addition to fruit flies, other research fields still need to implement with the above method, such as identifying the different insects or recognizing different characteristics of the same breed insect, thus other research fields have the same problem as the conventional method.

SUMMARY OF THE INVENTION

Therefore, a scope of the invention is to provide a new type of image method for classifying insects which can determine the classification of the insects automatically and improve the problems of the prior art.

According to an embodiment of the invention, the image method for classifying insects includes the following steps: obtaining detecting images of the insects in a detecting area; obtaining a first foreground image related to the insects by background subtraction; extracting the saturation from the first foreground image and eliminating the non-characteristic objects therein to obtain a second foreground image; extracting the characteristics related to the insects from the second foreground image according to a threshold; and, determining the classifications or the sexes of the insects according to the characteristics.

Furthermore, another scope of the invention is to provide a new type of a classifying process for insects, which applies an image method for classifying insects to classify the insects automatically and improve the problems of the prior art.

According to another embodiment of the invention, the classifying process for insects includes the following steps: placing the at least one insect in a detecting area, and shining a light on the detecting area; obtaining a detecting image of the at least one insect in a detecting area by an image detector; obtaining a first foreground image related to the at least one insect by background subtraction, according to a background image of the detecting area and the detecting image; extracting a saturation from the first foreground image and eliminating a non-characteristic object therein to obtain a second foreground image; extracting a characteristic related to the at least one insect from the second foreground image according to a threshold; determining the classification of the at least one insect according to the characteristic; and, collecting the at least one insect into a gathering unit according to the classification of the at least one insect.

Many other advantages and features of the present invention will be further understood by the detailed description and the accompanying sheet of drawings.

BRIEF DESCRIPTION OF THE APPENDED DRAWINGS

To facilitate understanding, identical reference numerals have been used, where possible to designate identical elements that are common to the figures.

DETAILED DESCRIPTION OF THE INVENTION

Figure 1:
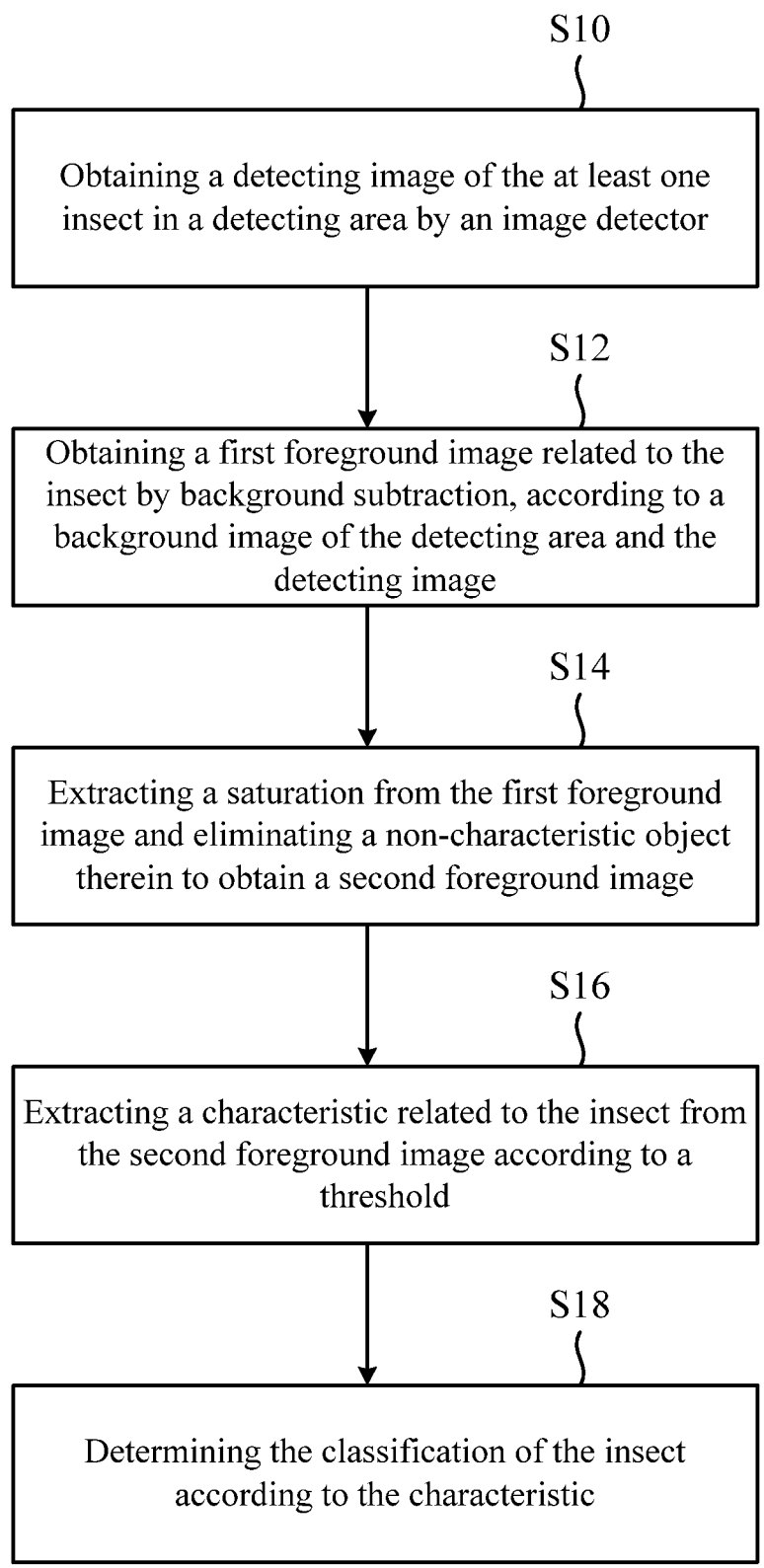
FIG. 1 is a flowchart illustrating an image method for classifying insects according to an embodiment of the invention.

The invention discloses an image method for classifying insects and a classifying process for insects. Please refer to FIG. 1. FIG. 1 is a flowchart illustrating an image method for classifying insects according to an embodiment of the invention. The method of this embodiment can be utilized for classifying insects, and more particularly for classifying the sexual dimorphism of tiny insects, such as fruit flies. Compare to the classifying methods of prior art, the method of this embodiment can save the manpower and time.

As shown in FIG. 1, the image method for classifying insects according to an embodiment of the invention comprises following steps: step S10: Obtaining a detecting image of the at least one insect in a detecting area by an image detector; step S12: Obtaining a first foreground image related to the insect by background subtraction, according to a background image of the detecting area and the detecting image; step S14: Extracting a saturation from the first foreground image and eliminating a non-characteristic object therein to obtain a second foreground image; Step S16: Extracting a characteristic related to the insect from the second foreground image according to a threshold; finally, at step S18: Determining the classification of the insect according to the characteristic.

In the embodiment, an insect can be placed into a detecting area, and the detecting area can be provided an appropriate illumination, so as to make the brightness in the detecting area enough to obtain a clear detecting image by an image detector. At step S12, the image detector can receive the image of the detecting area continuously, and further, the background image used for background subtraction can be obtained. For example, when the insect do not enter the detecting area, the detecting image obtained by the image detector without any insects can be the background images. And then, the image detector obtains the detecting image when the insect enter the detecting area, so as to obtain a first foreground image related to the insect in the detecting area by comparing the differences between the detecting image and the original background image.

After obtaining a first foreground image related to the insect in the detecting area, a saturation can be extracted from the first foreground image and a non-characteristic object therein can be eliminated to obtain a second foreground image, wherein the non-characteristic object is unrelated to the classification of the insect in the first foreground image. For example, as recognizing unbred female fruit flies, there is no categorized characteristic in the wing part, and the wing part may lead to error production, therefore, the wing part in the first foreground image is a non-characteristic object which should be eliminated. To be noticed, the non-characteristic object is not limited to being wing part, and it depends on different types of insects. For example, for horned insects, the horn part in the first foreground image is not a categorized characteristic, so the horn part is a non-characteristic object.

After obtaining a second foreground image, a characteristic related to the insect can be extracted from the second foreground image according to a threshold. For example, the copulatory organ of the abdominal of fruit fly in the second foreground image has a saturation larger than other parts; therefore, the saturation between the copulatory organ and other parts can be defined as a threshold. The saturation below the threshold would be eliminated in the second foreground image and only the saturation above the threshold been left, so the copulatory organ of fruit fly can be defined as a characteristic. Additionally, the positions of copulatory organ of male fruit fly and female fruit fly are different, so that the fruit fly in the detecting area can be classified as male or female.

In actual application, due to the unnoticeable characteristics of insects or the factors of equipment, there is a situation that cannot distinguish the characteristics or classify the insects sometimes. To avoid confusing the other recognized insects with the unrecognized insects, the insects in this situation can be classified as unrecognized.

The steps mentioned above can be controlled and operated by processors, in other words, the method of embodiment can detect and classify the insects in the detecting area automatically, so the method can save more manpower and time.

Figure 2:
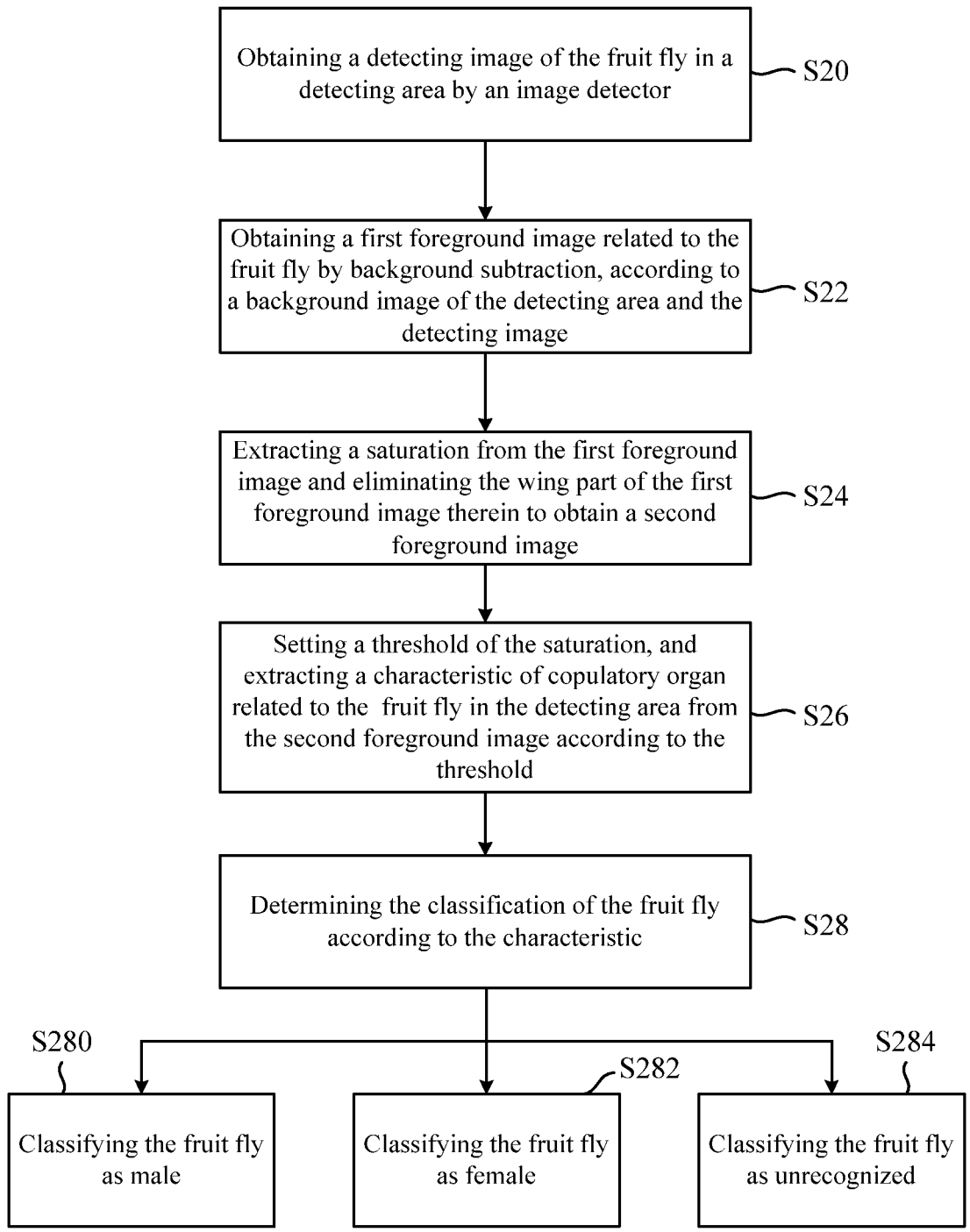
FIG. 2 is a flowchart illustrating an image method for classifying insects according to another embodiment of the invention.

Please refer to FIG. 2. FIG. 2 is a flowchart illustrating an image method for classifying insects according to another embodiment of the invention, used for classifying the genders of fruit flies and recognizing unbred fruit flies.

As shown in FIG. 2, the image method for classifying insects according to an embodiment of the invention comprises following steps: step S20: Obtaining a detecting image of the fruit fly in a detecting area by an image detector. In actual application, due to the gender identification characteristic of fruit fly is the copulatory organ of the abdominal, the detecting area can be a container with a transparent bottom, so that the image detector can be operated below the bottom plate to take a photograph of the abdominal of fruit fly.

At step S22: Obtaining a first foreground image related to the fruit fly by background subtraction, to be noticed, the first foreground image is according to a background image of the detecting area and the detecting image; step S24: Extracting a saturation from the first foreground image and eliminating the wing part of the first foreground image therein to obtain a second foreground image; step S26: Setting a threshold of the saturation, and extracting a characteristic of copulatory organ related to the fruit fly in the detecting area from the second foreground image according to the threshold; step S28: Determining the classification of the fruit fly according to the characteristic. As the steps above, the fruit fly can be classified into three categories: male (step S280), female (step S282), or unrecognized (step S284) according to the characteristic.

Figure 3:
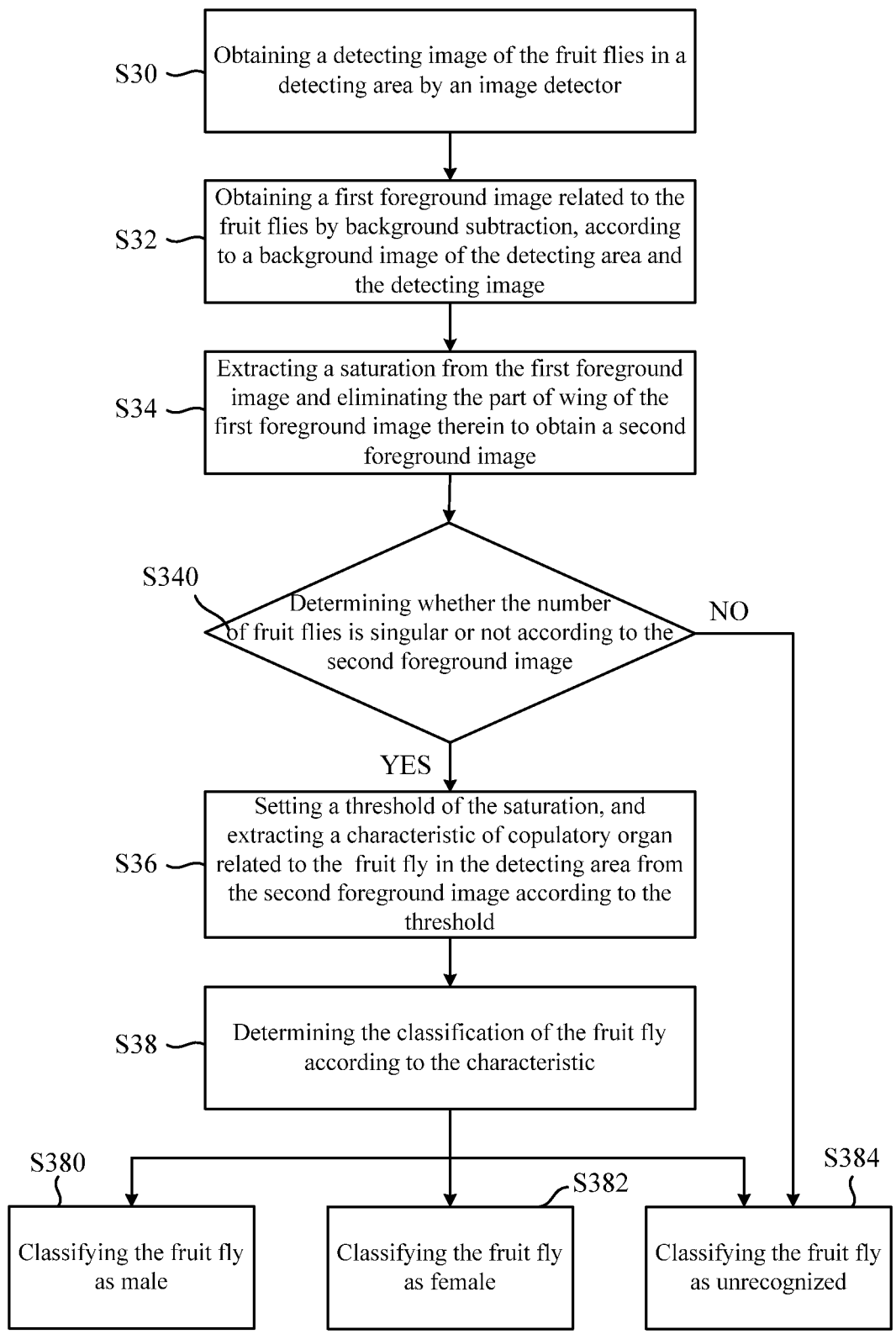
FIG. 3 is a flowchart illustrating an image method for classifying insects according to another embodiment of the invention.

Comparing the differences of copulatory organ of male fruit fly and female fruit fly, the characteristics of copulatory organ of male fruit fly are at the both ends of the long side of abdominal, but the characteristic of copulatory organ of the female fruit fly is at one end of abdominal. Therefore, if there are two female fruit flies entering the detecting area at the same time, the two female fruit flies may be classified as a male fruit fly and lead to a misidentification. In order to maintain accuracy of identification, the invention provides another embodiment. Please refer to FIG. 3. FIG. 3 is a flowchart illustrating an image method for classifying insects according to another embodiment of the invention. In the embodiment, the number of fruit fly in the detecting area would be examined and determined first.

As shown in FIG. 3, the image method for classifying insects according to an embodiment of the invention further comprises step S340: Determining whether the number of fruit flies is singular or not according to the second foreground image. If the number of fruit flies is singular, then step S36 continued: Setting a threshold of the saturation, and extracting a characteristic of copulatory organ related to the fruit fly in the detecting area from the second foreground image according to the threshold; otherwise proceed to step S384: Classifying the fruit fly as unrecognized. To be noticed, before extracting the characteristic of copulatory organ, the number of fruit flies can be determined by the first or second foreground image related to the fruit flies. For example, the number of fruit flies can be determined directly after obtaining a first foreground image. The steps of the embodiment mentioned previously and the steps in this embodiment are in essence the same, thus the steps needn't be elaborate any further.

Figure 4:
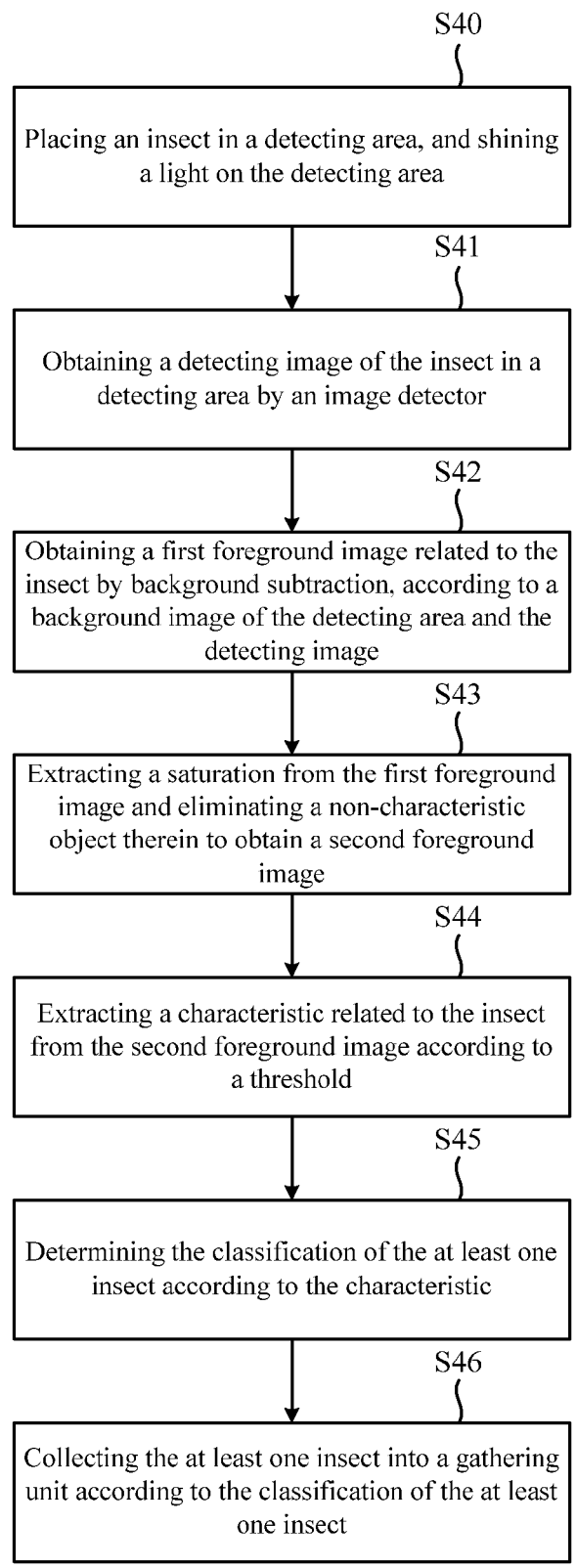
FIG. 4 is a flowchart illustrating a classifying process for insects according to another embodiment of the invention.
Figure 5:
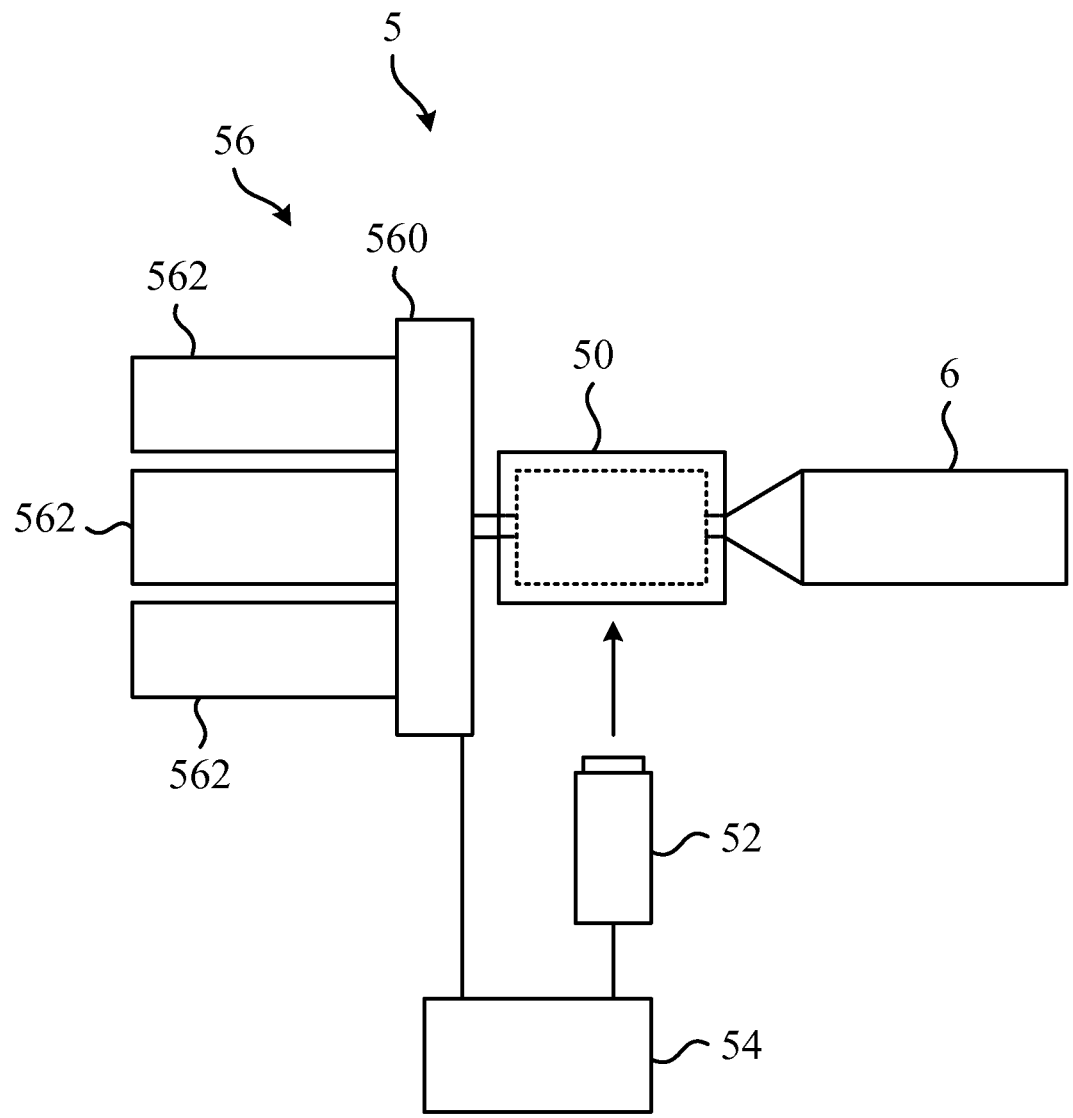
FIG. 5 is a schematic diagram illustrating a classifying equipment for insects according to FIG. 4.

Please refer to FIG. 4 and FIG. 5. FIG. 4 is a flowchart illustrating a classifying process for insects according to another embodiment of the invention. FIG. 5 is a schematic diagram illustrating a classifying equipment for insects according to FIG. 4. As shown in FIG. 4, the classifying process for insects according to an embodiment of the invention applies the image method for classifying insects mentioned previously to classify the insects. The classifying process further comprises following step: step S40: Placing an insect in a detecting area, and shining a light on the detecting area; and step S46: Collecting the at least one insect into a gathering unit according to the classification of the at least one insect.

As shown in FIG. 5, the classifying equipment for insects 5 which used for the classifying process for insects comprises a detecting area 50, an image detector 52, a computing processor 54, and a gathering unit 56. When an insect from collection tank 6 enters and stays in the detecting area 50, the light provided from step S40 can make the brightness in the detecting area 50 enough to obtain a clear detecting image by the image detector 52 at step S41. After that, the detecting image can be transmitted to the computing processor 54. Then the computing processor 54 can proceed from step S42 to step S45 and classify the insects in the detecting area automatically.

According to the results of classification, at step S46, the computing processor 54 can control the gathering unit 56 to collect the insects in the detecting area 50. In the embodiment, the gathering unit 56 comprises containers 562 for collecting different types of insects and a switching device 560 for switching these containers 562. Additionally, the computing processor 54 can be linked to the switching device 560, and control the switching device 560 to choose corresponding containers 562 for collection.

With the automated controls of the computing processor 54, the classifying process for insects according to the embodiment of the invention can save more manpower and time, and more particularly for classifying tiny insects.

According to the above, the invention is to provide an image method for classifying insects. The method extracts the characteristics related to the insect by background subtraction, and classifies the insects according to the characteristics. Furthermore, the image method for classifying insects can work with the help of computing processor, so as to classify the insects automatically. Compared to the prior art, the invention can detect the characteristics of insect more efficiently and reduce the resource consumption.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image method for classifying insects used for classifying at least one insect, the method comprising:
    obtaining a detecting image of the at least one insect in a detecting area by an image detector;
    obtaining a first foreground image related to the at least one insect by background subtraction, according to a background image of the detecting area and the detecting image;
    extracting a saturation from the first foreground image and eliminating a non-characteristic object therein to obtain a second foreground image;
    extracting a characteristic related to the at least one insect from the second foreground image according to a threshold;
    determining the classification of the at least one insect according to the characteristic;
    wherein the at least one insect is a fruit fly, the detecting image is of the abdominal of the insect in the detecting area, and the characteristic represents the copulatory organ of the abdominal of the insect.

2. The image of for classifying insects of claim 1, wherein the non-characteristic object is a wing part.

3. The image method for classifying insects of claim 1, further comprising:
    classifying the fruit fly into three categories: male, female, or unrecognized according to the characteristic.

4. The image method for classifying insects of claim 1, further comprising:
    estimating the number of the at least one insect according to the first foreground image or the second foreground image.

5. The image method for classifying insects of claim 4, further comprising:
    classifying the fruit fly into an unrecognized category when the number of the at least one insect is greater than one.

6. A classifying process for insects, applying an image method for classifying insects to classify at least one insect, comprising:
    placing the at least one insect in a detecting area, and shining a light on the detecting area;
    obtaining a detecting image of the at least one insect in a detecting area by an image detector;
    obtaining a first foreground image related to the at least one insect by background subtraction, according to a background image of the detecting area and the detecting image;
    extracting a saturation from the first foreground image and eliminating a non-characteristic object therein to obtain a second foreground image;
    extracting a characteristic related to the at least one insect from the second foreground image according to a threshold;
    determining the classification of the at least one insect according to the characteristic;
    collecting the at least one insect into a gathering unit according to the classification of the at least one insect;
    wherein the at least one insect is a fruit fly, the detecting image is of the abdominal of the insect in the detecting area, and the characteristic represents the copulatory organ of the abdominal of the insect.

* * * * *